United States Patent Office 2,776,960
Patented Jan. 8, 1957

2,776,960

MONOAZO DYES

Franz Frisch, Arlesheim, Switzerland, assignor to Sandoz A. G., Basel, Switzerland, a Swiss firm No Drawing. Application December 29, 1952,
Serial No. 328,511

Claims priority, application Switzerland January 9, 1952

7 Claims. (Cl. 260—196)

The present invention relates to monoazo dyes, and is based on the observation that the class of monoazo dyes corresponding to the formula

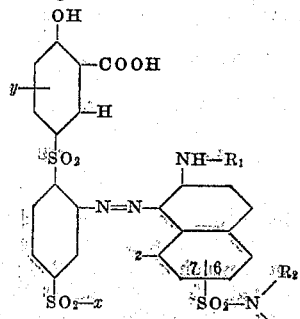

wherein the residue

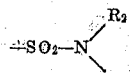

stands in one of the positions 6 and 7, $R_2$ stands for hydrogen or lower alkyl, $R_3$ stands for lower alkyl, cycloalkyl, aralkyl or phenyl, $R_1$ stands for hydrogen, methyl or ethyl, $x$ stands for lower alkyl, cycloalkyl, aralkyl, radicals of the benzene series or the residue

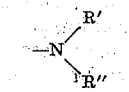

R' being hydrogen or lower alkyl, and R" being hydrogen, lower alkyl, cycloalkyl, aralkyl or radicals of the benzene series, R' and R" having together not more than 14 carbon atoms, $y$ stands for hydrogen or methyl, and $z$ stands—when the residue

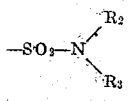

is in position 6—for hydrogen or hydroxy, and—when the residue

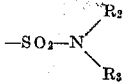

is in position 7—for hydrogen, are valuable metallizable products.

These new monoazo dyes according to the present invention are obtained by coupling the diazo compound from one mol of an amine of the formula

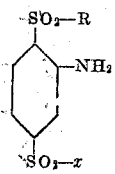

wherein $x$ stands for alkyl, cycloalkyl, aralkyl, a radical of the benzene series, the amino group, or the radical of a primary or secondary amine which contains a maximum of 14 carbon atoms and is connected to the $SO_2$ group by the nitrogen atom, and R stands for a radical of the benzene series which contains a nuclearly-bound carboxyl group and the ortho-position of which is occupied by hydroxyl, with an aminonaphthalene compound of the formula

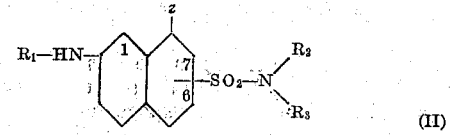

wherein the

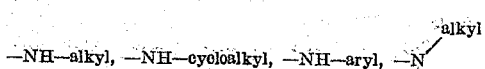

residue is in the 6- or 7-position, and $z$, $R_1$, $R_2$ and $R_3$ have the precedingly-indicated significances, the coupling taking place in the 1-position of compound II.

In the amine of formula I, $x$ may—in addition to $NH_2$, alkyl, cycloalkyl, aralkyl and mononuclear aryl—also represent $$-NH-alkyl, -NH-cycloalkyl, -NH-aryl, -N\begin{matrix}alkyl\\alkyl\end{matrix}$$

$$-N\begin{matrix}alkyl\\aryl\end{matrix} \text{ or } -N\begin{matrix}aryl\\aralkyl\end{matrix}$$

Accordingly, a large number of amines are suitable for use, in the form of their diazo compounds, for the preparation of the metallizable dyestuffs, according to the present invention. Illustrative of these amines are inter alia 2-amino - 4 - methylsulfone-4'-hydroxy-1,1'-diphenyl-sulfone-3'-carboxylic acid, 2-amino-4-cyclohexylsulfone-4'-hydroxy-1,1'-diphenylsulfone - 3' - carboxylic acid, 2-amino - 4 - benzylsulfone - 4' - hydroxy-1,1'-diphenylsulfone-3'- carboxylic acid, 2-amino-4-phenylsulfone-4'-hydroxy-1,1'-diphenylsulfone-3'-carboxylic acid, 2-amino-4-sulfonic acid - amide-4'-hydroxy-1,1'-diphenylsulfone-3'-carboxylic acid, 2-amino-4-sulfonic acid-methylamide-4'-hydroxy-1,1'-diphenylsulfone-3'-carboxylic acid, 2-amino-4-sulfonic acid - cyclohexylamide-4'-hydroxy-1,1'-diphenylsulfone-3'-carboxylic acid, 2-amino-4-sulfonic acid-phenylamide-4'-hydroxy - 1,1' - diphenylsulfone-3'-carboxylic acid, 2-amino-4-sulfonic acid-dimethylamide-4'-hydroxy-1,1'-diphenylsulfone-3'-carboxylic acid, 2-amino-4-sulfonic acid-N-ethyl-phenylamide - 4' - hydroxy-1,1'-diphenylsulfone-3'-carboxylic acid, and 2-amino-4-sulfonic acid-N-methyl-benzylamide - 4' - hydroxy-1,1'-diphenylsulfone-3'-carboxylic acid.

Illustrative of aminonaphthalene compounds of formula II suitable for use in making the dyestuffs of the present invention are inter alia 2-amino-8-hydroxynaphthalene-6-sulfonic acid-phenylamide, 2-methylamino - 8 - hydroxynaphthalene-6-sulfonic acid-ethylamide, 2-methylamino-naphthalene-6-sulfonic acid-cyclohexylamide, 2-methyl-aminonaphthalene - 6 - sulfonic acid - N - ethyl - phenyl-amide, 2-methylaminonaphthalene-6-sulfonic-acid-dimethylamide, 2-aminonaphthalene-6-sulfonic acid-phenylamide, and 2-methylaminonaphthalene-7-sulfonic acid-phenyl-amide.

In preparing the new dyes, the diazo compound from amine I is coupled with the aminonaphthalene compound II in weak mineral acid or organic acid medium, necessary with the addition of an organic solvent. Upon completion of the coupling, the dyestuff is separated by filtration, if necessary after evaporating off the organic solvent, and is then converted into the ammonium, lithium, sodium or potassium salt by dissolving it in dilute aqueous ammonia or lithium carbonate, sodium carbonate or potassium carbonate, respectively, after which the product is salted out, filtered off, and dried.

The new dyestuffs dissolve in water with red to blue-red coloration, and dye wool from a neutral to weakly acid bath in vivid yellow-red to blue-red shades, which change but slightly on afterchroming. Many of the new dyestuffs are also excellently suited for dyeing according to the single bath chroming process. The dyeings are characterized by very good fastness to light, fulling and carbonization.

The following examples are illustrative, but not limitative, of the invention. In the said examples, the parts are parts by weight, the percentages are by weight, and the temperatures are set forth in degrees centigrade.

*Example 1*

37.1 parts of 2-amino-4-methylsulfone-4'-hydroxy-1,1'-diphenylsulfone-3'-carboxylic acid are dissolved in 500 parts of water with the aid of sodium hydroxide, 36 parts of a 20% aqueous sodium nitrite solution are added to the resultant solution, after which the mixture is run in the course of a half hour into a mixture of 40 parts of concentrated hydrochloric acid and 200 parts of water at a temperature of at most 10°. The resultant yellowish diazo compound is substantially completely precipitated. Upon completion of the diazotization, excess nitrous acid is destroyed, and to the diazo suspension, acid to Congo red, there is added dropwise at 10–15° and in the course of a half hour a solution of 34.2 parts of 2-amino-8-hydroxynaphthalene-6-sulfonic acid-N-ethyl-phenylamide in 200 parts of methyl alcohol. Coupling takes place in the hydrochloric acid suspension, and the produced blue-red dyestuff precipitates. Upon completion of the coupling, the dyestuff is filtered off and washed with water. In order to convert it into the readily soluble sodium salt, it is dissolved in warm aqueous sodium carbonate solution, if necessary impurities are filtered off, the product salted out with sodium chloride, the precipitate filtered off and dried. The dyestuff is a blue-red powder which corresponds to the formula

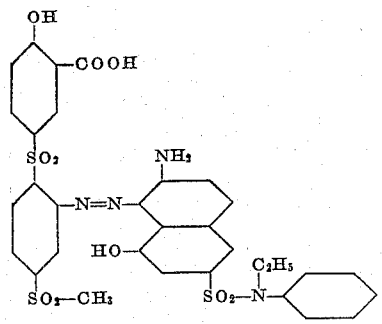

dissolves readily in hot water, and dyes wool from a neutral or weak acid bath in vivid blue-red shades which, upon afterchroming, become only slightly dulled. The dyestuff can also be used for dyeing according to the single bath chroming process. The dyeings are characterized by very good fastness to light, fulling and carbonization.

A similar dyestuff, which is slightly less blue, is obtained when, in the preceding paragraph, 37.2 parts of 2-amino-4-sulfonic acid-amide-4'-hydroxy-1,1'-diphenylsulfone-3'-carboxylic acid are used in preparing the diazo compound.

*Example 2*

37.1 parts of 2-amino-4-methylsulfone-4'-hydroxy-1,1'-diphenylsulfone-3'-carboxylic acid are diazotized as described in Example 1. Into the diazo suspension, a solution of 25 parts of 2-methylaminonaphthalene-6-sulfonic acid-methylamide in 200 parts of water and 15 parts of concentrated hydrochloric acid is run at 10° in the course of 10 minutes. Coupling starts immediately and the produced red dyestuff precipitates. After stirring for one hour, the coupling mass is made neutral to Congo red by the dropwise addition of a concentrated aqueous sodium acetate solution. The dyestuff is filtered off and is converted with aqueous ammonia into the ammonium salt and worked up, after the manner described in Example 1 for the preparation of the sodium salt. The dyestuff is a red powder which corresponds to the formula

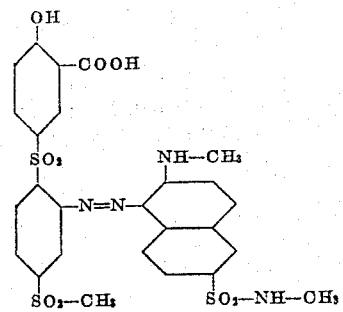

dissolves readily in hot water with resultant red coloration, and dyes wool from a neutral or weakly acid bath in vivid red shades which undergo but slight change upon being afterchromed. The dyestuff is also suitable for dyeing according to the single bath chroming process. The dyeings possess very good fastness to light, fulling and carbonization.

A similar dyestuff with even better neutral exhausting capacity is obtained when, in the preceding paragraph, 44.7 parts of 2-amino-4-benzylsulfone-4'-hydroxy-1,1'-diphenylsulfone-3'-carboxylic acid are used to prepare the diazo compound.

*Example 3*

44.8 parts of 2-amino-4-sulfonic acid-phenylamide-4'-hydroxy-1,1'-diphenylsulfone-3'-carboxylic acid are diazotized after the manner described in Example 1. A solution of 25 parts of 2-methylaminonaphthalene-6-sulfonic acid-methylamide in 200 parts of water and 15 parts of concentrated hydrochloric acid is run into the diazo suspension at 10° in the course of 10 minutes. Coupling commences forthwith and the produced red dyestuff separates out. After stirring for an hour, the coupling mass is adjusted to neutrality toward Congo red by the dropwise addition of a concentrated aqueous sodium acetate solution. The dyestuff is filtered off and is converted with lithium carbonate into the lithium salt and worked up, after the manner described for the preparation of the sodium salt in Example 1. The dyestuff is a red powder which corresponds to the formula

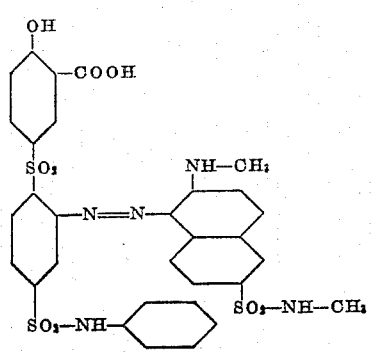

dissolves readily in hot water, and dyes wool from a neutral or weakly acid bath in vivid red shades which change only slightly upon being afterchromed. The dyestuff is excellently suited for dyeing according to the single bath chroming process. The dyeings possess very good fastness to light, fulling and carbonization.

A similar dyestuff is obtained when, in the preceding paragraph, the coupling is carried out with 32 parts of 2-methylaminonaphthalene-6-sulfonic acid-cyclohexylamide.

*Example 4*

37.1 parts of 2-amino-4-methylsulfone-4'-hydroxy-1,1'-diphenylsulfone-3'-carboxylic acid are diazotized. Into the diazo suspension, rendered acid with a mineral acid, there is added dropwise at 10° in the course of a half hour a solution of 31.2 parts of 2-methylaminonaphthalene-6-sulfonic acid-phenylamide in 200 parts of methyl alcohol. Coupling takes place forthwith, and resultant dyestuff is partly precipitated. After stirring for one hour, the suspension is adjusted to neutrality to Congo red with the aid of aqueous sodium acetate solution, and the methyl alcohol is evaporated. The produced dyestuff is filtered off cold and is converted into the potassium salt with the aid of potassium carbonate and worked up, after the manner described in Example 1 for the preparation of the sodium salt. The dyestuff is a red powder which corresponds to the formula

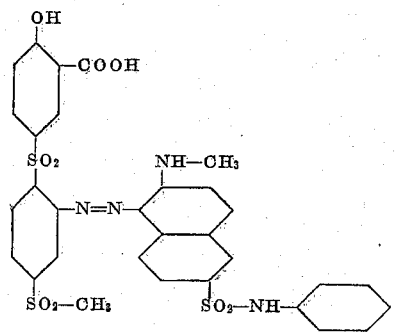

dissolves readily in hot water, and dyes wool from a neutral or weakly acid bath in vivid red shades, which change but slightly when afterchromed. The dyestuff is excellently suited for dyeing according to the single bath chroming process. The dyeings are very fast to light, fulling and carbonization.

A similar dyestuff, which is bluish red, is obtained when, in the preceding paragraph, the coupling is carried out with 31.2 parts of 2-methylaminonaphthalene-7-sulfonic acid-phenylamide.

*Example 5*

37.1 parts of 2-amino-4-methylsulfone-4'-hydroxy-1,1'-diphenylsulfone-3'-carboxylic acid are diazotized, after the manner described in Example 1. A solution of 29.8 parts of 2-aminonaphthalene-6-sulfonic acid-phenylamide in 300 parts of methyl alcohol is added dropwise to the diazo suspension, rendered acid with a mineral acid, at 10 to 15° in the course of one hour. Coupling begins at once, and the produced dyestuff separates out. After stirring for 2 hours, the suspension is rendered neutral to Congo red with the aid of an aqueous sodium acetate solution, after which the dyestuff is filtered off and converted with ammonia into the ammonium salt and worked up, after the manner described in Example 1 for the preparation of the sodium salt. The dyestuff is a brick-red powder which corresponds to the formula

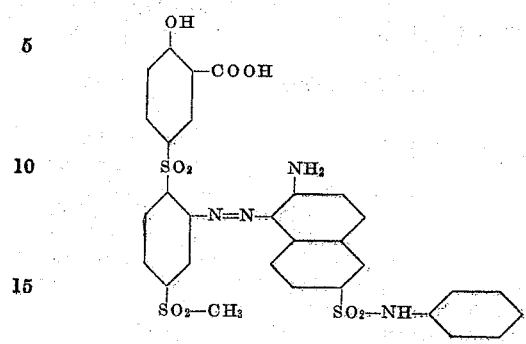

dissolves readily in hot water, and dyes wool from a neutral or weakly acid bath in vivid orange shades which undergo but slight change upon afterchroming. The dyestuff is excellently suited for dyeing according to the single bath chroming process. The dyeings are of very good fastness to fulling and to carbonization and are of excellent fastness to light.

Dyestuffs with similar properties are obtained when, in this example, on the one hand, the 2-amino-4-methylsulfone-4'-hydroxy-1,1'-diphenylsulfone-3'-carboxylic acid, used to prepare the diazo compound, is replaced by an equivalent quantity of one of the following carboxylic acids: 2-amino-4-ethylsulfone-4'-hydroxy-1,1' - diphenylsulfone-3'-carboxylic acid, 2-amino-4-n-propylsulfone-4'-hydroxy-1,1'-diphenylsulfone-3'-carboxylic acid, 2-amino-4-cyclohexylsulfone-4'-hydroxy-1,1' - diphenylsulfone - 3'-carboxylic acid, 2-amino-4-phenylsulfone-4'-hydroxy-1,1'-diphenylsulfone-3'-carboxylic acid, 2-amino-4-(4''-methyl)-phenylsulfone-4'-hydroxy-1,1'-diphenylsulfone-3'-carboxylic acid, 2-amino-4-(4''-chloro)-phenylsulfone-4'-hydroxy-1,1'-diphenylsulfone-3'-carboxylic acid, 2-amino-4-benzylsulfone-4'-hydroxy-5'-methyl-1,1' - diphenylsulfone-3'-carboxylic acid, 2-amino-4-sulfonic acid-methylamide-4'-hydroxy-1,1'-diphenylsulfone - 3' - carboxylic acid, 2-amino-4-sulfonic acid-cyclohexylamide-4'-hydroxy-1,1'-diphenylsulfone-3'-carboxylic acid, 2-amino-4-sulfonic acid-diethylamide-4'-hydroxy-1,1'-diphenylsulfone-3' - carboxylic acid, 2-amino-4-sulfonic acid-N-methylphenylamide-4'-hydroxy-1,1'-diphenylsulfone - 3' - carboxylic acid, 2-amino-4-sulfonic acid-N-ethyl-benzylamide-4'-hydroxyl-1,1'-diphenylsulfone-3'-carboxylic acid, 2-amino-4-sulfonic acid-benzylamide-4'-hydroxy-1,1'-diphenylsulfone-3' - carboxylic acid, 2-amino-4-sulfonic acid-(4''-methyl)-phenylamide-4'-hydroxy-1,1'-diphenylsulfone-3'-carboxylic acid, amide-4'-hydroxy-1,1-diphenylsulfone-3'-carboxylic acid, 2-amino-4-sulfonic acid-methylamide-4-hydroxy-6'-methyl-1,1'-diphenylsulfone-3'-carboxylic acid, or when, on the other hand, in any of the foregoing combinations, the azo component is replaced by an equivalent amount of one of the following compounds: 2-ethylaminonaphthalene-6-sulfonic acid-methylamide, 2-methylaminonaphthalene-7-sulfonic acid-cyclohexylamide, 2-aminonaphthalene-6-sulfonic acid-N-ethyl-benzylamide, or 2-amino-8-hydroxynaphthalene-6-sulfonic acid-phenyl amide.

*Example 6*

100 parts of pre-wetted wool are entered at 30–40° into a dyebath consisting of 2 parts of the dye disclosed in Example 1, paragraph 1, 1 part of potassium chromate, 5 parts of ammonium sulfate, 10 parts of sodium sulfate and 5000 parts of water. The temperature is raised to 100°, while stirring frequently, and the bath is maintained at boiling temperature for one and one-half hours. At the end of this period of time, the dyestuff will have completely drawn onto the wool; thereupon the dyed material is thoroughly rinsed with cold water and dried. An excellent dyeing is obtained.

The 2 parts of the dyestuff mentioned in the preceding paragraph may, with similar results, be replaced by 2 parts of any other one of the dyes disclosed in the foregoing Examples 1 to 5.

*Example 7*

100 parts of wool are entered into a dyebath consisting of 2 parts of dyestuff, 2 parts of concentrated acetic acid, 10 parts of sodium sulfate and 5000 parts of water. The bath is brought to boiling in the course of one-half hour and is then maintained at boiling temperature for 1 hour. During this time, 2 parts of concentrated formic acid are added to the bath. Upon completion of the dyeing process, the bath is cooled to 70° by the addition of cold water, after which 1 part of potassium bichromate is added and the bath again boiled for one-half hour. At the end of this operation, the dyeing will be chromed; it is then rinsed and dried. The 2 parts of dyestuff may be of any one of those disclosed in the preceding examples.

Having thus disclosed the invention what is claimed is:

1. A monoazo dyestuff which corresponds to the formula

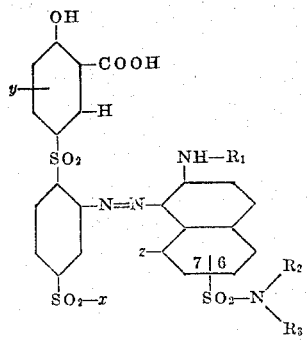

wherein the residue

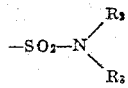

stands in one of the positions 6 and 7, $R_2$ stands for a member selected from the group consisting of hydrogen and lower alkyl, $R_3$ stands for a member selected from the group consisting of lower alkyl, cycloalkyl, aralkyl and phenyl, $R_1$ stands for a member selected from the group consisting of hydrogen, methyl and ethyl, $x$ stands for a member selected from the group consisting of lower alkyl, cycloalkyl, aralkyl, mononuclear carbocyclic aryl, amino, lower alkylamino, cycloalkylamino, phenylamino, methylphenylamino, N,N-lower dialkylamino, N-lower alkyl-N-aralkylamino and N-lower alkyl-N-phenylamino, the substituted amino groups containing a total of not more than 14 carbon atoms, $y$ stands for a member selected from the group consisting of hydrogen and methyl, and $z$ stands—when the residue

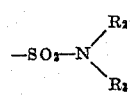

is in position 6—for a member selected from the group consisting of hydrogen and hydroxy, and—when the residue

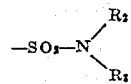

is in position 7—for hydrogen.

2. A monoazo dye which corresponds to the formula

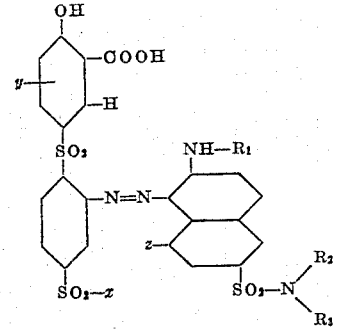

wherein $R_1$ stands for a member selected from the group consisting of hydrogen, methyl and ethyl, $R_2$ stands for a member selected from the group consisting of hydrogen and lower alkyl, $R_3$ stands for a member selected from the group consisting of lower alkyl, cycloalkyl, aralkyl and phenyl, $x$ stands for a member selected from the group consisting of lower alkyl, cycloalkyl, aralkyl, mononuclear carbocyclic aryl, amino, lower alkylamino, cycloalkylamino, aralkylamino, phenylamino, methylphenylamino, N,N-lower di-alkylamino, N-lower alkyl-N-aralkylamino and N-lower alkyl-N-phenylamino, the substituted amino groups containing a total of not more than 14 carbon atoms, $y$ stands for a member selected from the group consisting of hydrogen and methyl, and $z$ stands for a member selected from the group consisting of hydrogen and hydroxy.

3. The monoazo dye which corresponds to the formula

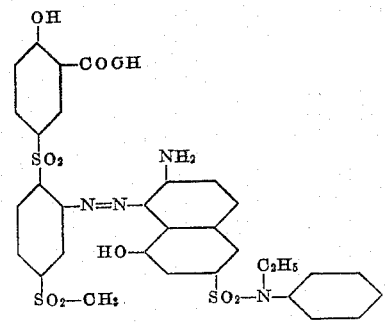

4. The monoazo dye which corresponds to the formula

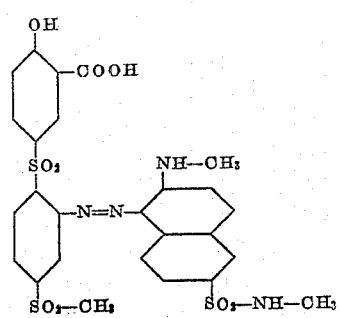

5. The monoazo dye which corresponds to the formula
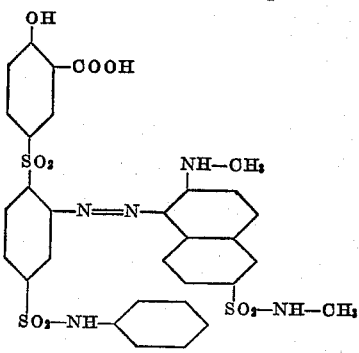
6. The monoazo dye which corresponds to the formula
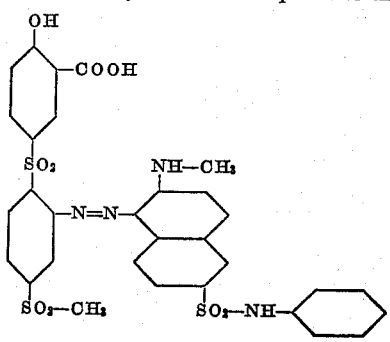
7. The monoazo dye which corresponds to the formula
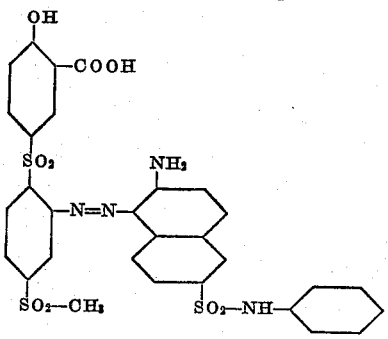
References Cited in the file of this patent
UNITED STATES PATENTS
| | | |
|---|---|---|
| 1,901,515 | Hentrich et al. | Mar. 14, 1933 |
| 2,476,259 | Mayer et al. | July 12, 1949 |